(12) United States Patent
Motz et al.

(10) Patent No.: US 6,247,267 B1
(45) Date of Patent: *Jun. 19, 2001

(54) METHOD FOR STABILIZING NATURAL TURF WITH DUAL PRIMARY STABILIZER

(75) Inventors: Joseph E. Motz; Mark A. Heinlein, both of Cincinnati, OH (US); Steve Linville, Rydal, GA (US)

(73) Assignee: Technology Licensing Corp, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,265

(22) Filed: Feb. 22, 2000

Related U.S. Application Data (63) Continuation of application No. 09/189,704, filed on Nov. 11, 1998, which is a continuation-in-part of application No. 08/870,541, filed on Jun. 6, 1997, now Pat. No. 6,029,397.

(51) Int. Cl.$^7$ .................................................. A01B 79/00
(52) U.S. Cl. ..................... 47/58.1; 47/1.01 F; 47/1.01 R; 47/9; 47/56; 405/258; 428/17; 428/85; 428/92; 428/95
(58) Field of Search ........................... 47/1.01 F, 10.1 R, 47/58.1, 9, 56; 428/17, 85, 92, 95; 405/258

(56) References Cited

FOREIGN PATENT DOCUMENTS

PCT/GB91/
01608    4/1992   (WO) .

OTHER PUBLICATIONS

Notts Sport, *Grass Reinforcement VHAF*, pages from website.
Notts Sport, *Landscape VHAF Erosion Control Fabrics*, double–sided, single–page brochure, 1988.
Notts Sport, *Heavily Worn Golf Courses Cry Out For Repairs*, single page brochure, 1988.
Notts Sport, *VHAF Winter Games Pitches—Erosion Control Fabrics*, double–sided, single–page brochure, 1988.
Notts Sports, *Golf Courses—VHAF Erosion Control Fabrics*, double–sided, single–page brochure, 1988.
Notts Sports, *Grass Reinforcement VHAF Installation Instructions*, 1990.

*Primary Examiner*—Leon B. Lankford, Jr.
(74) *Attorney, Agent, or Firm*—Wood, Herron & Evans (57) ABSTRACT

A stabilized turf (10) particularly suitable for athletic fields includes a mat (18) interposed between upper (24) and lower (16) layers of growth media, the mat (18) having a horizontally disposed, biodegradable primary backing (22) and generally upwardly extending fibers (20) secured thereto, wherein the fibers (20) extend above the upper layer (24) of growth media. Natural grass plants (26) extend upwardly above the upper layer (24), with the roots extending down through the backing (22) and into the lower layer (16). The mat (18) stabilizes root growth, particularly during initial grow in. The biodegradability of the primary backing (22) results in a loss of all or most of its horizontal structural integrity within a predetermined time period. The primary backing (22) may be treated with a decomposition agent to control the predetermined time period for decomposition, a stabilizing agent to assist in holding the upright fibers (20) or a growth agent for the natural turf grass. The mat (18) may also include a reinforcement primary backing (122*a*), to which the fibers (20) may be secured along with the biodegradable primary, or the reinforcement primary could stand alone, above or below the biodegradable primary. Aerating helps to disperse, i.e., reorient and vertically distribute, the fibers (22) within a subsurface vertical band (22*a*) greater in vertical dimension than the upper layer of growth media. The stabilized turf (10) can also be topdressed. Thus, this turf (10) is adapted to accommodate both aeration and topdressing, two well-recognized and advocated turf management practices.

14 Claims, 4 Drawing Sheets

METHOD FOR STABILIZING NATURAL TURF WITH DUAL PRIMARY STABILIZER

This application is a continuation of U.S. patent application Ser. No. 09/189,704, filed on Nov. 11, 1998, entitled "Stabilized Turf For Athletic Field," which is a continuation in part of prior U.S. application Ser. No. 08/870,541, which was filed on Jun. 6, 1997, now U.S. Pat. No. 6,029,397.

FIELD OF THE INVENTION

This invention relates to a natural turf for athletic fields, and more particularly to a natural turf which is stabilized via fibers and a growth media such as sand.

BACKGROUND OF THE INVENTION

Since Robey U.S. Pat. No. 4,023,506, it has been known that a flat layer of artificial fibers disposed below the ground can be used to enhance the stability of a natural turf located thereabove, by providing enhanced holding power for the root system of the natural grass. Thereafter, U.S. Pat. No. 4,044,179 and 4,337,283, issued to Haas, Jr., disclosed a surface comprising an artificial composite having a horizontal backing and upright fibers, with sand filled in to provide lateral support for the fibers. The primary purpose of the inventions disclosed in these Haas patents was to provide a stable, maintenance free surface for a variety of uses, such as a landing area for golf ball driving ranges, or even golf courses.

European patent application EP 0 403 008 A1 discloses a combination of natural grass and artificial fibers which extend upwardly from a horizontally disposed artificial backing to stabilize the natural grass. The roots of the natural grass extend downwardly through the backing, the grass extends upwardly above the fibers, and the artificial fibers are supported laterally by a fill layer, such as sand. Japanese Patent Application No. 59-151838 also discloses a combination surface of natural grass and artificial fibers, with the fibers secured to a decay resistant backing. This application states that the combination surface is particularly suitable for golf course tee boxes.

U.S. Pat. Nos. 5,489,317 and 5,586,408, issued to Bergevin, disclose and claim a structure similar to these prior disclosures, but with the specific feature of the sand fill layer terminating at the same vertical level as the tops of the artificial fibers. This results in an above-ground playing surface which is entirely natural grass, because the fibers do not extend above the sand. As indicated in the Bergevin patents and in the prosecution histories thereof, a relatively thick layer of sand is necessary to fill the fibers to their upper ends, to uniformly hold down the horizontal backing, and also to initiate natural plant growth at a vertical level which is very near to the top ends of the artificial fibers.

Such a substantial sand fill layer atop the horizontal layer and surrounding the artificial fibers forms a tight, uniformly compacted playing surface of natural grass. However, because of the height of the sand, i.e., to the tops of the fibers, the ground surface tends to become slick and hard once the natural turf begins to wear. The reason for this problem requires a discussion of the importance of turf management practices. It is a commonly understood turf management practice to apply periodic layers of "topdressing," usually sand, on a natural turf athletic surface, such as a ball field or golf course putting green or tee. The periodically applied layers of topdressing provide stability and some degree of firmness to the ground, but more importantly they create and help maintain an environment conductive to healthy plant growth and rapid recovery from use.

Most well kept athletic surfaces for sport purposes are maintained in such a way that the grass clippings are collected, rather than simply allowed to disperse on the surface. However, with natural grass plants, particularly under the intense maintenance regimes common or professional and collegiate facilities, even if clippings are collected there is still considerable production and decomposition of plant and root matter which can quickly build up and form a thatch layer. This decomposing plant matter will eventually form a thick organic layer if not managed. Agronomically, this organic layer has severe negative effects on drainage and movement of nutrients and pesticides into the root system. From an athletic playability standpoint, footing, surface speed, wear tolerance, ball roll and bounce, can be adversely affected. The organic layer can result in a condition known in the industry as "black layer," whereby the organic matter becomes anaerobic due to poor drainage and a loss of capacity for gas exchange. This condition can severally limit root growth and overall plant health.

It is well recognized that the periodic application of "topdressing," (i.e., a layer of growth media, usually sand or sand based, with a thickness in the range of about 0.125–0.25 inches), helps to prevent the forming of an organic layer of this type. Topdressing also ameliorates these harmful conditions if such a layer should begin to develop. Topdressing is typically applied 1–3 times per year. The number of applications depends to some extent on the availability of the field. The surface cannot be used immediately after topdressing because topdressing creates a loose layer on the playing surface, which adversely affects footing in the short term. With respect to the turf disclosed in the Bergevin patents, the application of the first layer of topdressing would immediately result in completely burying the upright artificial fibers, so that the fibers would be diminished in their ability to perform the intended purpose of providing lateral stability for the turf. Thus, the owner of the field must choose between the lesser of two evils, i.e., completely burying the stability fibers with the first application of topdressing or risking the possibility that an adverse "black layer" may eventually form at the ground surface. It is applicant's understanding that the written turf management guidelines for the Bergevin turf product specifically emphasize that topdressing should not be applied to the turf because it would negate the beneficial aspects of the product. Stated another way, this product forces the owner of an athletic field to disregard the well known turf maintenance practice of applying topdressing. Thus, the wear of the turf eventually causes slickness, but one of the normal turf management steps for ameliorating this condition is discouraged.

Another commonly recommended and practiced turf management strategy involved aerating a natural turf. As with applying topdressing, aerating is periodically performed to decrease the build-up of organic matter on the surface, decrease compaction, keep the surface well drained and to maintain a vigorous natural turf canopy. Typically, aerating is done with the same frequency or in conjunction with topdressing, due to scheduling, although additional aerations without topdressing may provide further agronomic benefits. But again, the frequency depends on field availability and scheduling. Aerating is usually done by inserting and removing into the turf hollow tines which are 0.375–0.75 inches in width. In order to penetrate an entire thatch layer and the uppermost root zone area of the natural turf it is typically necessary to aerate to a depth of three inches or greater.

Unfortunately, with the various prior art natural grass/artificial fiber turfs described above, it can become difficult to aerate down to the desired depth because of the structural density of the horizontal backing which holds the artificial fibers. This is particularly true if aerating is done with hollow aerating tines, which are preferred over solid pointed tines. Also, if aerated too many times, the backing would no longer be able to achieve its stated purpose of holding the fibers. With the product constructed in accordance with the Bergein patents, the management guidelines recognize this problem, and the turf management manual states that aeration should not be implemented. Thus, while this structure initially provides increased stability for the natural turf surface, the horizontal backing hinders the performance of one of the most basic turf management practices, namely aerating with hollow tines. The athletic field owner is again forced to disregard an advantageous turf management principle.

The horizontal backing can also act as a flow barrier between the layers of growth media located above and below. This can adversely affect drainage or subirrigation of the field. This concern arises particularly with respect to subsurface drainage, irrigation and heating systems, and controls therefor, as disclosed in applicant's PCT Application Nos. PCT/US95/11891 and PCT/US96/02207. In essence, the horizontal backing and/or the organic surface layer can create a "perched water table" above the underlying growth media, a condition which is readily understood by those skilled in the art. By creating a perched water table at the top of the root zone, downward movement of water and nutrients and upward movement of water by capillary action ("wicking") during sub-irrigation and the natural phenomenon of evapoatranspiration are significantly inhibited. In essence, the subsurface materials above the backing are isolated from those below it.

Thus, the relatively recent developments in combining artificial fibers with natural grass plants have produced only limited advances in achieving a stabilized natural turf athletic field, particularly but not exclusively for natural turfs which are constructed of soils high in sand content. The relatively slow market acceptance of these stabilized turfs to date indicates that there is room for improvement, primarily from an agronomic standpoint.

A stabilized natural turf may be initially grown on a sod farm, on top of a plastic layer, until it is ready to be cut and then transported to the ultimate site where it is to be used. Since the transporter will typically pay transportation costs which are directly proportional to the weight of the material being transported, it is desirable to minimize the overall weight of the components which make up the stabilized athletic turf grown at the sod farm. Large layers of sand atop the horizontal backing are counter-productive in this regard.

SUMMARY OF THE INVENTION

It is an object of the invention to improve upon the stability of a natural turf, particularly for athletic fields, while at the same time allowing the natural turf to be compatible with readily accepted turf management practices such as aeration and topdressing.

It is another object of the invention to achieve a stable natural turf with minimal organic residue at the surface thereof and improved drainage capability.

It is still another object of the invention to achieve a stable natural turf which is more compatible with state of the art subsurface control systems for drainage and irrigation.

It is still another object of the invention to achieve a stabilized natural turf wherein the stabilizing fibers do not become buried with the first application of topdressing.

It is still another object of the invention to achieve a stabilized natural turf which is more efficiently harvested at a sod farm without waste, and then economically and conveniently transported from the sod farm to another site, such as a stadium.

The present invention achieves the above-stated objects by utilizing, in conjunction with natural grass plants, an improved stabilizing mat having non-biodegradable fibers secured to a substantially biodegradable backing. When the backing is disposed horizontally, the fibers are generally upright. A stabilizing upper layer of growth media, such as sand, supports the bottom portions of the generally upright fibers. The upper portions of the fibers extend above the upper layer of growth media.

Thus, the backing is only temporary, because it eventually goes away. The substantial biodegrading, i.e., decomposing, of the backing promotes drainage and subirrigation, by eliminating any barrier effects. As the backing substantially decomposes and the grass plants mature, aeration will cause the upright fibers to vertically disperse somewhat, thereby increasing the vertical dimension of the stabilized ground beyond the vertical dimension of the individual fibers. This occurs as a result of the interaction of the aerating tines and the fibers. Because the fibers initially extend well above the upper layer, the stabilized turf of this invention can be topdressed without burying the fibers on the first application of topdressing, or even within the first few applications. The biodegrading of the backing makes it easy for the hollow aeration tines to move vertically therethrough to allow aeration of the natural turf down to optimal depths, to promote healthy maturation of the natural grass plants. Because the stabilized turf of this invention can be aerated and topdressed when needed, the turf has excellent drainage capabilities with minimal opportunity of "black layer" formation.

Additionally, the invention contemplates treating the biodegradable backing so as to accelerate or decelerate the biodegrading process, as desired. Normally, an untreated homogeneous woven backing of jute, for instance, will decompose completely within about one year or so, but it will lose its structural integrity much sooner than that, i.e., within several months. These time periods to some extent depend on the climate, i.e., temperature and wetness. The substantial decomposition time period should be determined and correlated to the time it takes for stable root growth for the natural grass plants. Stated another way, once a suitable grow in period is determined for the natural grass plants for the athletic field in question, the backing can be made and/or treated to substantially biodegradable within about that same time period.

Once the backing has substantially decomposed, there is no longer any hindrance to normal drainage or even vacuum-assisted drainage, a type of drainage which is common with some of the more sophisticated state of the art control systems for athletic fields around the world. Also, the non-biodegradable fibers are able to reorient from generally upright positions and even to migrate vertically in response to aeration of the turf. As a result, the fibers become distributed over a stabilizing band which is greater in vertical dimension than the fibers themselves. Despite decomposition of the backing, the non-biodegradable fibers continue to provide stabilized support for the natural grass plants, because their performance of that function does not require the continued presence of the backing. Moreover, this vertical redistribution of the fibers minimizes the possibility that subsequent applications of topdressing will eventually bury all of the fibers.

According to a first preferred embodiment of the invention, the mat comprises non-biodegradable artificial fibers made of polypropylene secured in upright orientation to a homogeneous horizontal backing woven out of jute. The preferred manner of securement is by tufting. The backing is "finished" on both sides by applying a secondary coating thereto in liquid form, such as an acrylic latex suspended in a dispersing agent such as water. The first finishing step occurs on the upper surface of the backing before securement of the non-biodegradable fibers, while the second finishing step, i.e., the backside application, occurs after fiber securement. These secondary backings, as known in the carpet backing industry, help to secure the fibers to this backing. In affect, they serve as temporary stabilizing agents. They are temporary because they decompose several weeks after the mat has been underground. To some extent, and depending on the material, the stabilizing agent may affect decomposition. Additionally, a decomposition agent, specifically an anti-microbial such as zinc condition, may also be included in the liquid dispersion in an effective amount to slow the rate of degradation of the woven portion of the backing.

If grown in at a field site, the mat, i.e., the backing with the fibers secured generally upright thereto, is laid upon a lower fill layer of growth media, such as sand, then an upper fill layer is applied thereto. Preferably, the upper fill layer of growth media extends only about halfway to two thirds of the way up the fibers. Thereafter, the upper fill layer is seeded, sprigged or in some cases, covered with a sod which has been pressure washed, or any other form of turfing. After the grow in period, natural grass plants extend upwardly above the upward layer, alongside and eventually above the tops of the upright fibers, with roots that extend downwardly through the backing and into the lower layer of growth media. If the stabilized turf is grown at a remote site such as a sod farm, then there is no lower layer of sand used at the sod farm. The mat is placed directly on a sheet of plastic. Everything above remains the same. Because the total material transported to the installation site includes only a relatively thin upper layer of growth media, this invention minimizes the vertical dimension and the overall weight of the turf to be transported. Since the upright fibers extend above the sand, the playing surface comprises natural grass plants and upright fibers, with the tops of the fibers generally located below the tops of the natural grass plants. The location of the fibers above the top of the upper layer of growth media helps to maintain good footing and minimum slickness of the playing surface as the natural grass plants decompose.

The use of an upper fill layer which resides below the upper ends of the artificial fibers also allows the application of topdressing to the natural turf surface. Because the topdressing layers usually have a vertical dimension of about 0.125 to 0.25 inches, and because some settling may occur after the application of topdressing, none of the first few applications of topdressing will bury the fibers. By allowing this turf management practice of periodically applying topdressing, this invention helps to eliminate or at least to significantly reduce the undesired build up of homogeneous organic residue at the surface. Thus, the playing surface of the stabilized turf does not become slick or slippery as the natural turf begins to wear. Also, because the fibers still extend above the ground surface even after several applications of topdressing, they continue to provide some degree of added surface friction to the ground. This helps to assure continued sure footing on the playing surface, and athletic play on the field can be resumed relatively soon after applying topdressing.

Advantageously, the substantially biodegradable backing absorbs and holds moisture and soluble nutrients, unlike the artificial non-biodegradable backing materials of prior art stabilized turfs. This moisture and nutrient holding capability is particularly beneficial in the turf establishment period. If desired, a fertilizing agent can also be incorporated into the backing, to further assist natural plant growth. Also, once moisture-laden, the backing becomes heavier and less likely to slide laterally relative to the underlying layers. Applicant believes this feature to be particularly true for a woven jute backing. This also helps to minimize the possibility of differential shift of different sections of a turf athletic field.

The substantially biodegradable backing also provides important advantages in both turf stability and economics for turf grown at a sod farm. Specifically, the backings of adjacent sections can be secured, i.e., sewn or stapled, together to provide a seamless turf. This securement together of adjacent backing sections is particularly advantageous prior to transport from a turf farm to a site, particularly for end to end seams of rolled turf sections residing in a single row. As the turf is rolled up along the row, it may tend to separate or tear along the transverse seam. Securement of the transverse end to end seams eliminates this problem.

As an alternative to the above-described embodiment, the backing can be supplemented with a synthetic material, such as polypropylene, and woven therein to provide reinforcement and added strength, and to slow the overall decomposition rate, so that substantial degradation is delayed. This reinforcement may comprise the longitudinal or the transverse fibers of the backing.

As yet another embodiment of the invention, the backing may be reinforced with a layer of relatively lightweight mesh, having open cells or a relatively high degree of openness, thereby to form a non-biodegradable layer of the backing. It is believed that a composition backing having a first "primary" layer of woven jute reinforced with a second "primary" layer of mesh would not necessarily need to be treated with a decomposition agent to decelerate substantial biodegrading nor a stabilizing agent to assist in temporarily holding the fibers. Alternatively, at least one of the above-described finishing applications could be omitted.

The reinforced layer of mesh aids in laterally stabilizing the turf after the biodegradable backing has substantially decomposed. Nevertheless, this mesh layer is of such a light weight and such an open cell construction as to permit vertical flow therethrough of water and nutrients and also to permit relatively easy aeration therethrough with hollow tines. Even if such an aerating tine should contact the mesh, the mesh is sufficiently thin so as to be frangible, or breakable under such a force.

With this embodiment, the non-biodegradable mesh layer and the biodegradable layer of the backing, i.e., the two "primary" backings, are simultaneously run through a tufting machine, which tufts the non-biodegradable fibers thereto. Thus, with this construction the horizontal portion of the mat is substantially biodegradable, but not completely biodegradable.

According to another variation of the invention, a "stand-alone" layer of stabilizing mesh may be separate from the mat, and rolled out onto the lower fill layer prior to and separately from the substantially biodegradable mat which has the artificial fibers secured thereto. This variation of the invention would be less expensive because it could eliminate the need to tuft through two primary layers, which in some cases could be somewhat detrimental to the tufting machine over a period of time. Yet, the reinforcement benefit of the mesh layer would still be achieved. Also, if the natural turf is brought from a sod farm, this variation of the invention could save costs by delaying the need from the mesh layer, because the stand alone mesh layer may only be needed at the site of the athletic field when sod from the sod farm is installed thereover.

This variation of the invention would also enable the rows of the separate mesh layer to be oriented at an angle, preferably perpendicular, with respect to the rows of the substantially biodegradable mats. This would add overall stability to the field surface because each seam of either a mat section or a "stand-alone" mesh section would be lapped by an overlying or underlying section.

With respect to this variation, the invention further contemplates the alternative of rolling out the "stand-alone" mesh layer sections after installing the substantially biodegradable mat sections, with the stand alone mesh layer residing above the mat. Also, there may be some applications where the stand alone mesh layer and a reinforcement primary layer of mesh are used.

These and other features of the invention will be more readily understood in view of the following detailed description and the drawings.

BRIEF DESCRIPTION OF THE DRAWINGS

FIG. 3 is a perspective view of a turf stabilizing mat constructed in accordance with another preferred embodiment of the invention.

DETAILED DESCRIPTION OF THE DRAWINGS

Figure 1:
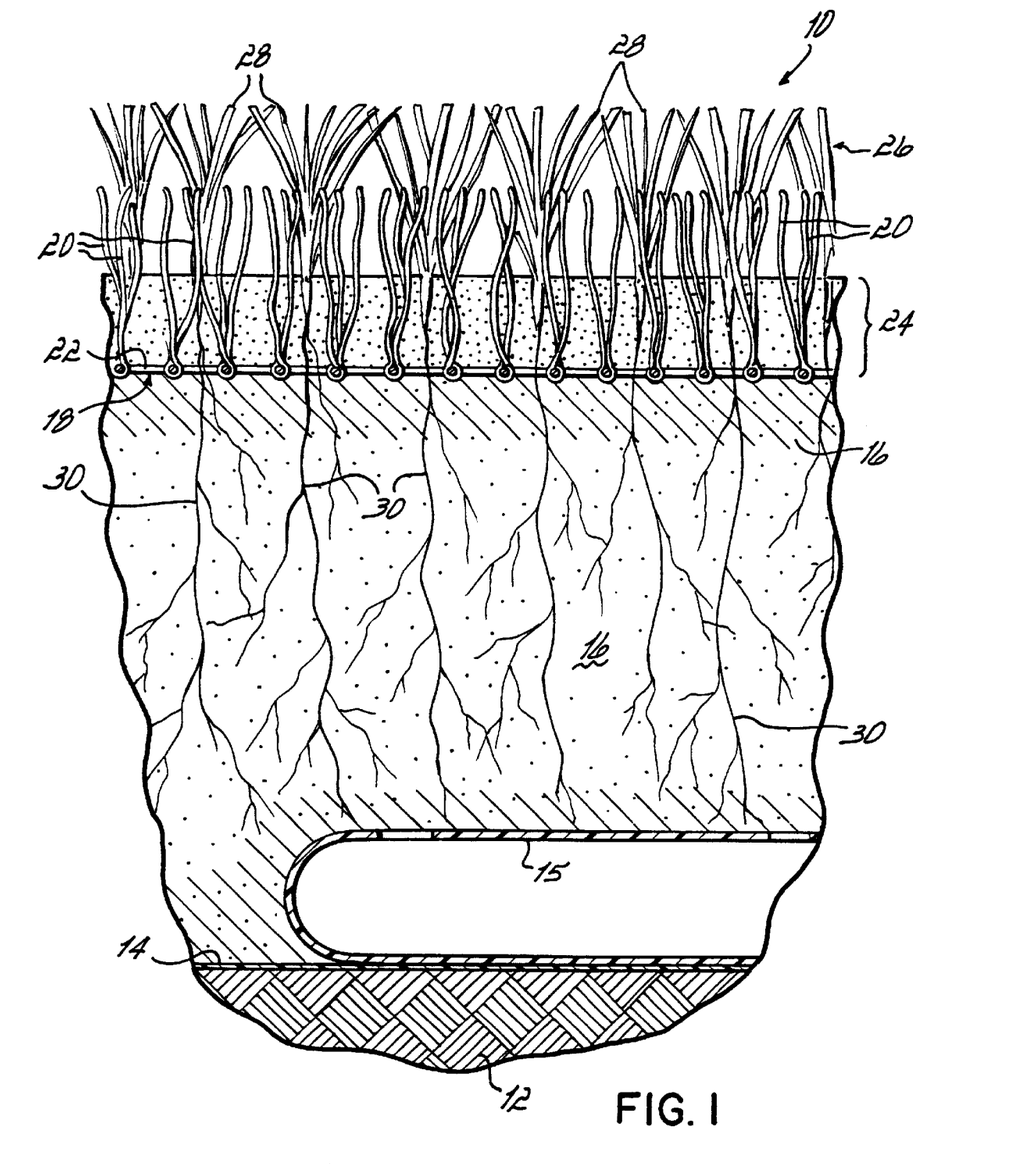
FIG. 1 is a cross-sectional view of a stabilized natural turf in accordance with a first preferred embodiment of the invention.

FIG. 1 shows, in cross-section, a stabilized natural turf surface or stabilized turf 10 in accordance with a first preferred embodiment of the invention. In the context of this application, the term stabilized natural turf surface and stabilized turf are used interchangeably. When in place, the surface 10 includes a compacted subsurface 12, which is typically graded to a desired level with a desired degree of uniformity. If desired, a barrier 14 may reside on the subsurface 12, the barrier 14 supporting one or more drainage components 15 for draining, subirrigating or heating the surface 10, as disclosed in applicant's PCT patent application Ser. Nos. PCT/US95/11891 and PCT/US96/02207, which are expressly incorporated by reference herein in their entirety. Alternatively, the natural turf surface 10 may be installed over sand or soil fields which may or may not have a prepared or compacted subsurface and installed drainage or irrigation components.

Typically, a lower fill layer 16 of growth media, such as sand, soil or the like, resides above the subsurface 12, at a depth which varies depending upon the application. Typically, sand sports fields are constructed with about 6–12 inches of fill layer 16. A stabilizing mat 18 rests on the lower layer 16. The mat 18 has generally upright fibers 20 which extend generally upwardly from a horizontally disposed backing 22. These fibers 20 are non-biodegradable and preferably have a length dimension above the backing 22 which is in the range of about 1–2 inches, although the length could be lesser or greater, and a target denier in the range of about 7600–10,000. Typically the fibers 20 are made from a tape which is fibrillated, and then spun into a thread at a rate of ¾ twist/inch, although those skilled in the art readily understand that this is only one of several methods of manufacturing the non-biodegradable fibers 20. The fibers 20 may be made of synthetic material, such as polypropylene, polyethylene, nylon, polyester, or they could even be made of a natural material which is either inherently non-biodegradable or treated so as to be non-biodegradable. The fibers 20 are secured to the backing 22 preferably at a density of 11.5 stitches per 3 inch section and a stitch gauge of ⅜" to ⅝". This is preferably done by tufting the fibers 20 to the backing 22 in a zig zag pattern.

The backing 22 is substantially biodegradable, so that is will substantially decompose within a predetermined time period. Applicant has found that woven jute is a suitable material for the backing 22. This is similar to what was previously done with respect to the manufacture of primary backings for carpet, before the standardized use of synthetic materials for that purpose. However, whereas the jute backing of carpet represented a disadvantage, because the jute was susceptible to moisture retention if the carpet became wet, in this application the jute backing 22 provides an agronomic advantage in that the moisture retention promotes growth of the natural grass plants 26. The natural jute backing 22 preferably has a weave density of 15 threads by 13 threads per square inch, resulting in a weight of approximately 9 oz. per square yard and a sheet width in the range of 12–15 feet. Such a backing 22, as shown in FIG. 1, is completely biodegradable over a sufficient period of time. However, as described above, "complete" decomposition is not necessary, only decomposition such that the backing 22 has little or no remaining horizontal structural integrity. At this point, water flow is unimpeded and the fibers 20 are free to migrate vertically in response to contact with aerating tines.

With the backing 22 of jute as described immediately above, it is believed that complete decomposition will occur within about 8–12 months. However, the horizontal structural integrity will severely diminish within as few as two months, particularly in warmer and wetter climates such as Florida. Once that occurs, the backing 22 has "substantially biodegraded."

For the embodiment of FIG. 1, the stabilized turf 10 can be aerated at any time it makes agronomic sense to do so. It is not necessary for the backing 22 to completely decompose in order for the aerating tines to pass therethrough and extend therebelow. In the context of this application, the phrase "substantially biodegradable" refers to something which is sufficiently biodegradable, within a given time period, to lose all or most of its horizontal structural integrity. At that point, water and nutrients flow readily in a vertical direction through the space previously occupied by the backing 22. With the backing 22 substantially biodegraded, there is no impeding effect at all on the aerating tines, and these tines cause vertical movement of the fibers 20.

Other substantially biodegradable materials such as cotton, flax, hemp, sisal, burlap (sometimes called jute) or the like could also be used for the backing 22. Even more recent man-made biodegradable materials could also be used. Applicant believes that such materials currently exist and are used in the diaper making industry. According to the first embodiment, the backing 22 is woven, with transversely and longitudinally extending strands of the same material, such as jute, so that the backing 22 is homogeneous. The backing 22 could also be stitched or knitted. The fibers 20 are held to the backing 22 by stitching, i.e., tufting, preferably in a zig-zag pattern.

With this embodiment, two secondary backings help to temporarily hold the fibers 20 to the backing 22. One secondary backing is applied prior to tufting the fibers 20 to the jute backing 22, and the second secondary backing is applied thereafter. Each of these secondary backings is applied by using a liquid-coating "finishing" technique recognized in the carpet-making industry. The possible materials for the secondary backing include but are not limited to acrylic latex, starch, calcium carbonate and urea, applied in a dispersing agent and then heated to achieve a desired coating. The amount of coating is usually quantified in dry weight per unit area. According to the first embodiment, acrylic latex was used to produce a dry weight on the primary of about 1.5–4.0 ounces per square yard, with a dry weight of 3 ounces per square yard being preferable. These secondary backing materials are all considered biodegradable. Within a period of weeks, they will decompose due to subsurface conditions. Their primary function is to temporarily assist in holding the fibers 20 during handling and installation. In essence, these materials serve as agents for temporary securement of the fibers. Yet, to some extent they may have an effect on biodegradation time, because they provide a protective coating for the backing 22. Applicants believe that a coating of acrylic latex of this type will extend, or decelerate, substantial biodegrading to about 5–8 months, but that again depends on other factors.

Also, a decomposition agent, specifically zinc omadine, an anti-microbial, was included in the liquid dispersion in a range of about 0–10 parts per million to decelerate decomposition of the backing 22. Applicant used zinc omadine 48% FPS, provided by Olin under product code CPE00306#, in a quantity of about 4 parts per million. If desired, a natural grass growth agent such as a fertilizer or a pesticide may also be included in the liquid dispersion. Some of the above-identified stabilizing agents also can serve as growth agents, such as calcium carbonate.

The decomposition agent is used because in most climates substantial biodegrading occurs too soon, i.e., within two to three months. This usually will not be long enough for sufficient maturation of the root system. Thus, for the woven jute backing 22 according to the first embodiment, the treatment with a specific decomposition agent, such as zinc omadine, causes substantial biodegrading to be delayed up to several years if desired. The amount of the decomposition agent, the type of decomposition agent and the manner of application will depend upon the climate and wetness at the site, the soil conditions at the site, the density and material of the backing 22, the other agents used on the backing 22, and how soon the field needs to be ready for play, among other things. There may be other instances where it is desirable to accelerate decomposition. Again, this will depend on the conditions identified above, such as the material and density of the backing 22, and the climate. Other than treating the backing 22, another possible method of accelerating the decomposition rate would be to inoculate, prior to placement of the mat 18, the backing 22 or the fill layer 16 with biological agents which use cellulose from the jute backing 22 for energy.

The prior art Bergevin patents disclose the general concept of a secondary backing, i.e., a coating such as latex, on a primary backing which is non-biodegradable, wherein the secondary backing helps to hold the artificial fibers to the backing for about 1–3 weeks but biodegrades thereafter. However, this is the only disclosed backing material which biodegrades. The primary remains intact over time. In contrast, this invention represents an improvement because the backing 22, which in this case is of homogeneous wove jute transversely (weft) and longitudinally (warp) extending biodegradable fibers, substantially biodegrades within a predetermined time period. Once substantially biodegraded, the backing 22 is no hindrance to water or nutrient flow, i.e., it does not create any barrier effect, and it also promotes aeration. The substantial biodegradation is selectively controlled, preferably via the decomposition agent, so that the horizontal structural integrity of the mat 18 remains intact during the important grow-in period.

An upper fill layer 24 is located above the stabilizing mat 18. Again, as with the lower layer 16, the upper layer 24 of growth media may be of sand, or any other particulate material which promotes plant growth and provides stabilization and cushion, such as diatomaceous material, calcined clay, crumbed rubber or other organic or inorganic additives. The upper layer 24 resides within and surrounds the fibers 20 of the stabilizing may 18, to laterally support the fibers 20 in a generally upright position and to provide stabilization for the turf surface 10. Preferably, the upper layer 24 extends about halfway to two-thirds of the way up the vertical lengths of the fibers 20, to allow sufficient room for initial application of topdressing, and to reduce the overall weight, which is particularly advantageous in the case of sod farm production. In the first preferred embodiment, the layer 24 preferably resides at least about 0.50" below the tops of the fibers 20, with the fibers 20 extending about 1.50" above the backing 22.

Natural grass plants 26 extend upwardly through the upper layer, with the tops 28 of the grass plants 26 extending above the fibers 20. The natural plants 26 also extend downwardly through the backing 22 and into the lower layer 16. Thus, the tops 28 of the grass plants 26 are above the tops of the fibers 20, and the crowns of the grass plants 26 reside within the upper layer 24, while the roots 30 extend through the backing 22 and terminate in the lower layer 16. The playing surface, i.e., the material residing above the upper layer 24 of growth media, comprises both natural grass 26 and non-biodegradable fibers 20. The upper layer 24 and/or the lower layer 16 may be inoculated with microbes to establish a beneficial population of micro-organisms, since sand is typically sterile, prior to sodding the upper layer 24 with grass plants 26. In a sense, these microbes could be considered a decomposition agent and a growth agent, because depending on their composition and distribution, they could accelerate biodegrading of the backing 22 and also promote growth of the grass 26. To that extent, these effects need to be taken into account in determining the time period for substantial biodegrading. The grass plants 26 can be generated by seeding, sprigging or even laying down sod which has bee jet washed to remove undesired soil and particulate.

It is anticipated that exposing approximately the upper portions of the fibers 20 above the upper layer 24 will result in the "ballooning" of the tips of the fibers 20. Ballooning, as will be understood by one of ordinary skill in the art, results when the exposed tips of the fibers 20 fray and/or fluff, which is beneficial to the turf system 10 because it will promote fibrillation and movement of the fibers 20 throughout the depth of the turf 10 in response to normal wear, aeration and/or other standard turf maintenance procedures. It also provides a less slick playing surface in the event natural turf is worn away.

Figure 2:
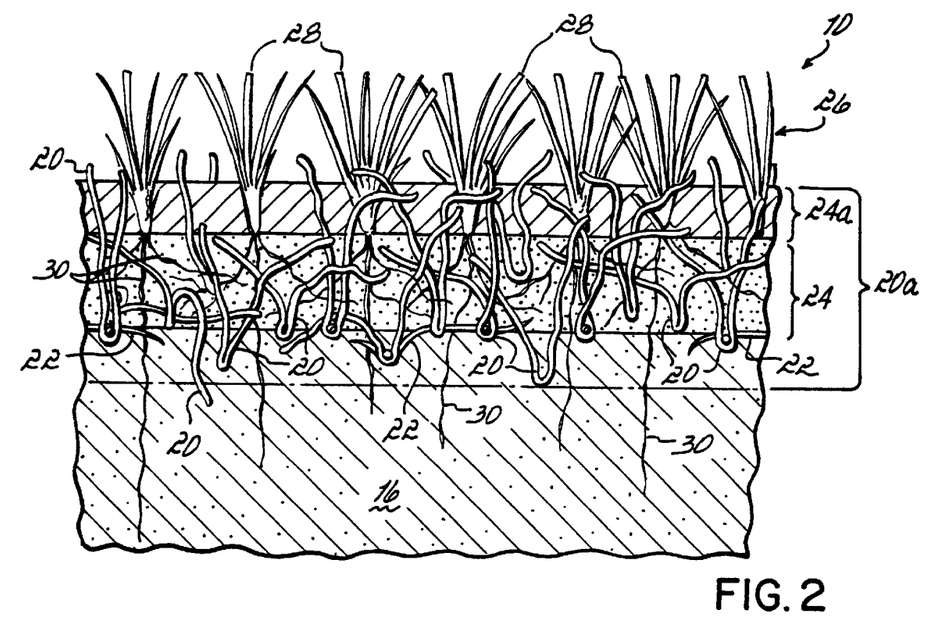
FIG. 2 is a cross-sectional view of the stabilized turf shown in FIG. 1, but after the backing 22 has substantially biodegraded and the stabilized turf has subsequently been aerated.
Figure 4:
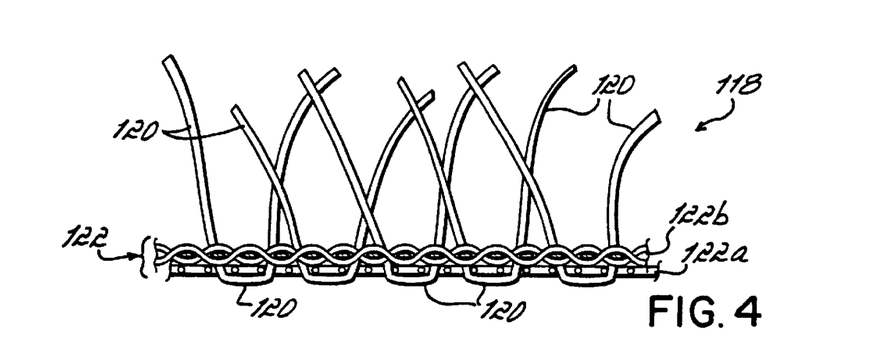
FIG. 4 is a side view of the mat shown in FIG. 3.

FIG. 2 shows the backing 22 after substantial biodegradation has occurred, and after topdressing 24a has been applied. In contrast to FIG. 1, where the fibers 22 occupied only a vertical band which corresponded to upper layer 24, FIG. 2 shows the fibers 20 vertically distributed within a vertical band 20a. This band 20a is greater in vertical dimension than the fibers 20 themselves, because the fibers 20 have migrated vertically. This migration occurs in response to movement of the aerating tines downwardly through the turf 10 during aeration. This migration effectively produces this subsurface stabilizing band 20a. Thus, aerating of the turf 10 not only produces the commonly known agronomic benefits, it also assures continued stabilization of the turf 10 long after installation, by continuing to redistribute the fibers 20. These advantages are possible only because the backing 22 is substantially biodegradable within a predetermined time period.

As noted above, the backing 22 may be woven, knitted or tufted. The backing 22 may also be reinforced for added strength for certain applications. The reinforcement may be done by increasing the thickness of the transverse and/or longitudinal fibers, or by adding a synthetic strand, fiber or filament such a polypropylene. These added strands could be laced into the weave of the backing 22 or perhaps substituted for the transverse or the longitudinal fibers. However, it is important that the backing 22, even if it is a composite of this type and not homogeneous, but substantially biodegradable.

FIG. 3 shows a second preferred embodiment of this invention. A turf 10 made according to this embodiment would be identical to the turf 10 of FIGS. 1–2 except that the mat 118 is different. More specifically, mat 118 includes a backing 122 with a non-biodegradable open cell web 122a for reinforcement. Stated another way, the backing 122 is a composite which has two "primary" backings, or layers. The first is a completely biodegradable layer 122b, of a material such as jute, and the second is a non-biodegradable layer 122a, such as a synthetic web. Preferably, the web 122a is made of non-biodegradable polypropylene, to provide some minimal ongoing lateral structural integrity for the mat 118. However, the cells of the web 122a are sufficiently open and the longitudinal and transverse strands are sufficiently thin that the composite backing 122a is still considered substantially biodegradable. This is because there is sufficient openness to allow passage therethrough of water and nutrients and there is no barrier effect created. Also, the fibers 120 are relatively free to migrate in response to contact with aerating tines. The individual strands of the web 122a will break if they happen to be contacted by hollow tines during aeration.

For the mat 118, the composite backing 122 included a layer 122a made from polypropylene, with a strand count of 5×5 and a weight of 1.728 ounces per yard. This layer 122a is commercially available from Conwed Plastics of Roseville, Minn., and identified as Product No. R07821-002. The "strand count" refers to the number of "cells" per square inch. A stand count of 5×5 refers to a mesh with 25 cells per square inch, in 5 rows and 5 columns. Applicant believes that a strand count as low as 2×2 would also work, but that a strand count with larger openings would possibly cause problems with aeration tines due to thickness of material.

To make a mat 118 which has a composite backing 122 of a first layer 122b of homogeneous woven biodegradable material and a second layer 122a of non-biodegradable mesh, the layers 122a and 122b are simultaneously run through a tufting machine to secure the non-biodegradable fibers 120 thereto. Thus, other than the tufted fibers 120, there is nothing holding the layers 122a and 122b together. The fibers 120 are tufted in a predetermined density, by stitching with a ⅝" gauge, in an acute zig zag pattern to maximize the amount of material on the underside of the backing 122. This manner of fiber securement provides additional initial horizontal strength for the mat 118 and increases the ability of the turf 10 to vertically redistribute the fibers 120 through the rootzone during aeration (FIG. 3). With this reinforcement layer 122a, it may not be necessary to treat the backing 122 with a decomposition or a stabilizing agent because of the added lateral stability provided by the mesh. Thus, the need to apply one or more secondary coatings in finishing steps may be eliminated. On the other hand, it may be desirable to apply one "finishing" treatment on the backside of the mat 118 to include one or more of the following agents: a decomposition agent, a stabilizing agent and a growth agent.

With either mat 18 or mat 118, the benefits of the invention result from the ability to practice standard agronomic maintenance principles for the turf 10, i.e., aerating and topdressing, whenever desired after installation. As noted previously, prior stabilized turfs either did not recommend these practices, or resulted in other disadvantages if these turf maintenance practices were used.

If the stabilized turf 10 is initially grown at a remote site such as a sod farm, in preferably 12 to 15 feet wide sections of any desired length, the mat 18 (or 118) is rolled out on a synthetic barrier of some sort, such as plastic. The plastic barrier inhibits root growth into the ground below, thereby eliminating the need to cut the turf 10 at the roots prior to transport. The structure of the turf 10 thereabove remains the same as shown in FIG. 1 except that the grass 26 has not yet grown in and there is no lower layer 16. That is, the upper layer 24 of growth media is filled in around the fibers 20 (or 120), preferably leaving at least about 0.5 inches of the fibers 20 extending thereabove. The upper layer 24 is then seeded, sprigged or planted with power washed sod, or other known turfing method.

Figure 5:
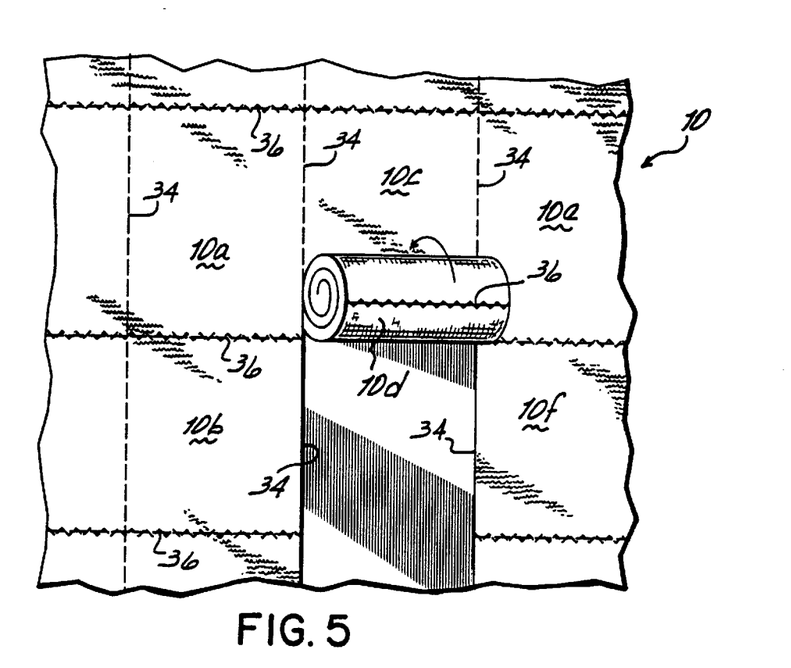
FIG. 5 is a plan view which schematically shows parallel rows of the stabilized turf of the invention during growth at a sod farm.

Once a sufficient growing time period has passed and there has been sufficient growth of the roots 30 into and through the backing 22 (or 122), the natural turf 10 is ready to be cut longitudinally and rolled in desired lengths for transport to a site for use, such as an athletic stadium. In FIG. 5, the lines 34 show longitudinal seams extending along adjacent rows of sections of turf 10. Reference lines 36 show transverse seams. The sections correspond to the sizes of turf 10 to be actually unrolled into place at the installation site, with at least two sections per each roll piece to be unrolled into place. The longitudinal seams 34 are formed by cutting longitudinally, and at least some of these seams may correspond to longitudinal seams of the backing, but that is not necessarily true. If there is sufficient root growth, the longitudinal seams of the backing become irrelevant. The securement is particularly important where a roll of turf extends and must be rolled across a transverse extending seam of the backing. Reference numerals 10a–10f show the locations of individual sections of turf 10. Sections 10a and 10b are in one row, while sections 10c and 10d and 10e and 10f are in the next two rows, respectively. Sections 10c and 10d have been rolled up, while the other sections are shown in place.

The individual sections of the turf 0 may be joined to adjacent sections by securement of the edges of the corresponding backings 22 (or 122). This can be done by sewing with a fabric thread such as jute or a synthetic thread such as polypropylene. It can also be done by stapling the backings 22 together. Thin metal staples typically degrade by rusting within about 8 months. Securing the adjacent sections of turf 10 is beneficial whether the turf 10 is initially installed on-site or grown at a sod farm. For turf 10 grown at a sod farm, it is particularly advantageous along the transverse, or butt joints, of sections residing in a single row. This is because rolling of the turf 10 for transport to a remote site generates a stretching force on the turf 10. This stretching force can cause separation of the turf 10, particularly along the transverse seams of adjacent sections, for instance along the seam between rolled sections 10c and 10d (FIG. 5). Securing the transverse edges together eliminates the risk of the turf 10 pulling apart during rolling along one of the seams 36, particularly if a subsection of turf is cut at a sod farm in a manner such that the subsection spans one of the transverse seams 36.

Securement of adjacent turf sections together also helps at the field site, whether grown in initially or moved thereto from a sod farm. With some prior turfs, including those with artificial backings, it was sometimes necessary to provide a reinforced foundation underlying adjoining turf sections, to minimize differential settling or vertical shifting of one section relative to an adjacent section. On the other hand, when the stabilized turf 10 of this invention is installed on-site at the athletic facility, the stability of the turf 10 is significantly increased because the secured together adjacent sections neither shift relative to one another nor become exposed.

Figure 6:
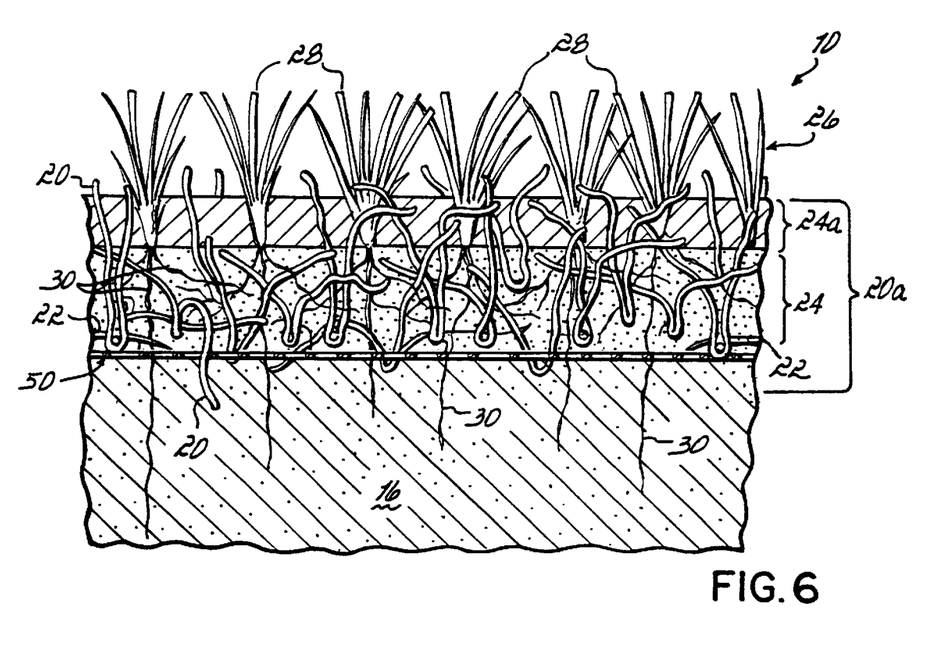
FIG. 6 is a cross-sectional view, similar to FIG. 2, showing a stand alone layer of mesh residing adjacent what is left of the mat, below the upper fill layer and above the lower fill layer, according to another variation of the invention.

As shown in FIG. 6, another variation of the invention contemplates a separate, or "stand alone" layer 50 of mesh residing adjacent the mat 18, above the lower fill layer 16 and below the upper fill layer 24. This layer 50 may be made of the same material as the reinforcement primary backing 22a, which is described above. In this case, the stand alone layer 50 resides below a "stabilizer" layer 51, which is a mat 18 of the type previously described with respect to FIG. 1. To install a stabilized natural turf of this type, parallel rows of sections 50a of the stand alone mesh layer 50 are placed, preferably by unrolling, on an underlying surface, in this case the lower fill layer 16. Parallel rows of sections 51a of the stabilizer layer 51 are then placed, preferably by unrolling, on the stand alone mesh layers 50a, with the two layers 50 and 51 of rows preferably angled, as at 90°, to lap the joints of each of the sections 50a and 51a. If desired, the sections 51a may be secured together, and/or the sections 50a may be secured together.

Figure 7:
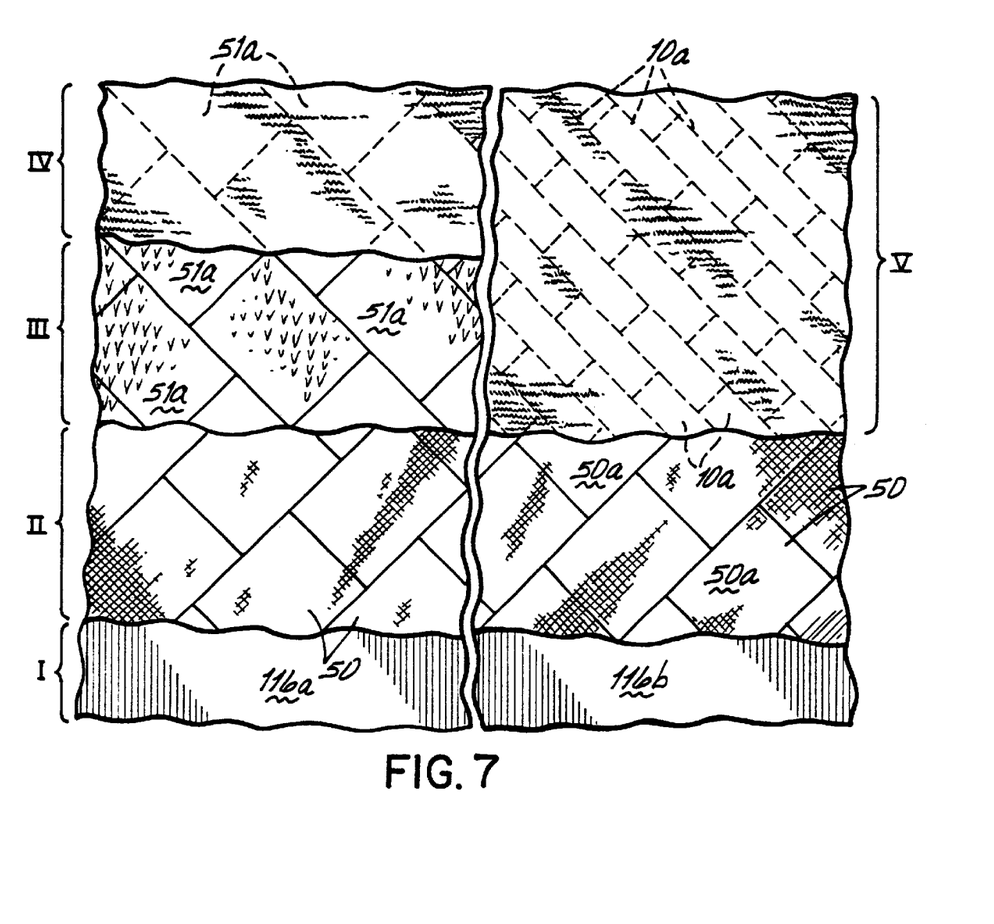
FIG. 7 is a plan view, in cut away portions, which schematically shows installation of the FIG. 6 variation of the invention, with a stand alone mesh layer residing on a lower fill layer and a stabilizer layer residing thereabove.

FIG. 7 illustrates the results of this installation. Region I (both sides) represents the underlying surface, which on the left side is represented by reference numeral 116a and can be either a lower growth layer 16 at a field site or a plastic sheet at a sod farm, while reference numeral 116b on the right side represents a lower growth layer 16 at a field site. Region II (both sides) represents the layer of non-biodegradable mesh 50, including sections 50a rolled out at a 45° angle and laid end to end in parallel rows. Region III (left side) represents the stabilizer layer 51 after installation but prior to grow in of the grass, with stabilizer sections 51a rolled out and laid end to end in parallel rows which are oriented transverse to the rows of mesh layers 50a. Region IV (left side) shows Region III but after addition of the upper fill layer 24 and after the grass 55 has grown in above the artificial fibers of the sections 51a, with the boundaries of the separate sections 51a shown via dash lines. Regions III and IV represent initial grow in of the natural plants with the reinforcement layer 50 already in place. This represents what will almost always occur when the natural grass is grown in at the field site. This may also be the procedure procedure used for growing the natural plants at a sod farm, although it is not necessarily the procedure to be used.

For instance, Region V (right side) represents a situation where separate, already grown subsections 10a of stabilized turf (of the type shown in FIG. 1) reside directly above the layer 50 as shown in Region II, after the subsections 10a have been moved from a sod farm to an installation site. Each subsection 10a includes what remains of the corresponding stabilizer section 51a along with the upper growth layer and the grown in natural grass, but after the subsections 10a have been cut into smaller rolls at the sod farm. In this example, the already mature natural grass eventually grows further downwardly through the stand alone layer 50 and into the lower growth layer 16 at the installation site, i.e., the field.

This variation of the reinforced embodiment of the invention enhances the overall stability of the final stabilized turf, because there is less likelihood of turf separation along a seam, either a seam of the stabilizer layer 51 or a seam of the stand alone mesh layer 50. With this variation, the mesh sections 50a may be secured together and the stabilizer sections 51a may also be secured together. Eventually, the stabilizer layer 51 substantially biodegrades, while the stand alone mesh layer 50 remains in place in its entirety, except that it may become broken up somewhat in response to aeration tines. For that reason, it is constructed so as to be breakable upon impact by hollow aeration tines, to allow the tines to pass downwardly therethrough.

This variation of the reinforced embodiment of the invention is particularly advantageous when used at the sod farm or the field installation site, as a grown-in field (Regions III and IV) because the grass plants grow into the stabilizer layer 51 and the mesh layer 50 at the same time. When the mesh layer 50 is not used during initial growing of the natural plants, but is put down separate from turf received from a sod farm (as in Region V), the stand alone mesh layer 50 is not needed until the turf has matured and is ready to be installed at the site of the field. This delay in the need for the layer 50 represents a cost deferment for the installer, which may be advantageous in some cases.

This variation of the reinforced embodiment of the invention provides ongoing stability for the stabilized athletic turf, initially after installation and also after the mat 18 has substantially biodegraded, but the invention provides enhanced stability without inhibiting the ability of the fibers 26 to vertically migrate in response to aeration. As shown in FIG. 6, the mesh layer 50 initially defines the top layer of growth media 24, and hence the vertical dimension of the stabilizer zone 20a. But after adding a layer of the top dressing 24a and aeration of the turf, the stabilization zone 20a expands upwardly to include the added top dressing layers and also downwardly, even below the layer of the mesh 50.

The following examples refer to grow-in installations.

EXAMPLE I

According to the first preferred embodiment of this invention, a laser graded surface is covered with a stabilized synthetic, sand-filled mat 18 constructed of 100% polypropylene fibers 20 (10,000 denier, 0.75 twist, approx. 970 g/m$^2$), stitched (tufted) in a chevron pattern into a woven backing 22 made of natural and biodegradable fibers. The fiber mat 22 has a plain weave, with a fiber count of 15×13 count, a face weight of approx. 340 g/m$^2$ and is manufactured in 4.6m widths. It is treated with a stabilizing agent and a decomposition agent, as described previously, to extend the time required for biodegradation once placed in the field and to help secure the fibers 20, as described previously. The backing 22 including this coating has a minimum weight of 408 g/m$^2$.

The polypropylene fibers 20 tufted into the mat 18 extend 38 mm above the surface in a vertical orientation. The manufactured mat 18 has a minimum total weight of 1.375 kg/m². The mat 18 is rolled onto a laser graded sand surface, adjacent rolls abutted and the seams secured together to create a continuous, seamless "carpet" across the entire playing surface.

Once installed, the vertically stitched fibers 22 are filled to approximately 65% of their height (i.e., slightly less than 25 mm) with the same specified sand as was used to create the rootzone. The sand is applied in lifts and broomed into the mat to assure the synthetic fibers 20 remain upright. After all the sand has been spread the surface is planted with top quality, nursery grown hybrid Bermuda grass sprigs, such as GN-1, or similar. The grow-in period begins immediately following completion of the sprigging process and is expected to last about eight weeks, and possibly longer.

EXAMPLE II

This example is identical to Example I, except that mat 118 is used instead of mat 18. This means that the backing 122 includes two primaries, one 122b being biodegradable jute and the other 122a being a polypropylene mesh with a strand count of 5×5. The fibers 120 are simultaneously tufted to both primaries 122a and 122b. Also, the treatment for the backing 118 may differ, because no decomposition agent nor any stabilizing agent for the fibers 120 may be necessary, or at least only one side may need to be coated.

The stabilized natural turf 10 of this invention provides a stable playing surface with a stable base and a completely natural turf look and feel, with the playing surface comprising natural grass 26 and, to some extent, the upper ends of the fibers 20 (or 120). Eventually, the fibers 20 become buried due to topdressing applications. But by then the backing 22 (or 122) has substantially biodegraded. By then the fibers 20 (or 120) have also vertically migrated and reoriented. These results are produced because common turf management practices, namely topdressing and aeration, can be repeatedly used with this stabilized turf 10. These practices can be used after the initial grow in primarily because of the relative height of the upper layer 24 with respect to the fibers 20 and because the backing 22 is substantially biodegradable.

While preferred embodiments of the invention have been described, it will be readily understood by those skilled in the art that variations may be made thereto without departing from the spirit of the invention. For instance, there may well be other materials for making the backing 22 of the mat 18 substantially biodegradable. Moreover, for such other materials, the weave density or the fiber thickness may be subject to variation. Moreover, depending upon the growth environment and the agronomic conditions, the relative thickness of the lower layer, and the upper layer relative to the non-biodegradable fibers may change. These factors may also depend upon the type of grass being used.

We claim:

1. A method of installing stabilized natural turf comprising:

preparing a foundation; and placing a mat on the foundation, the mat including a backing oriented horizontally and a plurality of fibers held by the backing and extending generally upwardly therefrom, an upper layer of growth media located above the mat and surrounding the fibers, and natural grass plants having roots and crowns, the roots extending downwardly through the backing and the crowns located above the backing, the tops of the grass plants extending above the upper layer, wherein the backing includes two primaries, with a first primary and a second primary, the second primary being more open in construction than the first primary, at least initially at the time of installation, so that the two primaries have different degrees of permeability, thereby to facilitate root growth therethrough and into the foundation to stabilize the natural grass plants.

2. The method of claim 1 wherein the placing further comprises:

separately placing a plurality of mat sections together to cover the foundation, each of the mat sections being in the form of sod and including therewith the upper layer of growth media and the natural grass plants.

3. The method of claim 2 wherein the mat sections are rolled into place to cover the foundation.

4. The method of claim 1 wherein one of the two primaries is substantially biodegradable.

5. The method of claim 1 wherein the fibers are tufted to the two primaries.

6. A method of growing a stabilized natural turf comprising:

growing natural grass plants in a layer of growth media located above a foundation, at least an upper portion of the growth media residing above a horizontal backing of a stabilizer mat, the stabilizer mat further including a plurality of fibers held to the backing, the backing including two primaries having different degrees of permeability, the roots of the natural grass plants extending downwardly below the backing and the blades of the natural grass plants extending above the growth media.

7. The method of claim 6 wherein one of the two primaries is substantially biodegradable.

8. The method of claim 6 wherein the fibers are tufted to the two primaries.

9. A method of maintaining the stabilized natural turf of claim 6 comprising:

applying a layer of topdressing on top of the natural grass plants, thereby to prevent organic buildup at the surface.

10. A method of maintaining the stabilized natural turf of claim 6 comprising:

aerating the stabilized natural turf to a depth below the backing.

11. A method of installing a stabilized natural turf comprising:

placing a plurality of stabilized natural turf section together over a foundation to cover a desired area of the foundation, each of the stabilized natural turf sections including natural grass plants having roots extending downwardly through a layer of growth media and upwardly above the growth media, the sections further including a backing residing below the growth media, the backing including a first woven primary and a second primary, the two primaries together being sufficiently root permeable to permit passage therethrough by the roots of the natural grass plants, with a plurality of fibers held to the two primaries, the fibers extending generally upwardly and surrounded by the growth media, wherein the fibers help to stabilize the natural grass plants.

12. The method of claim 11 wherein the sections are placed by rolling.

13. The method of claim 11 wherein the fibers are tufted to both primaries.

14. The method of claim 11 wherein one of the primaries is substantially biodegradable.

* * * * *

UNITED STATES PATENT AND TRADEMARK OFFICE
CERTIFICATE OF CORRECTION

PATENT NO. : 6,247,267 B1
DATED : June 19, 2001
INVENTOR(S) : Joseph E. Motz, Mark A. Heinlein and Steve Linville It is certified that error appears in the above-identified patent and that said Letters Patent is hereby corrected as shown below:

Column 1,
Line 19, reads "No." and should read -- Nos. --.
Line 66, reads "conductive" and should read -- conducive --.

Column 2,
Line 5, reads "common or professional" and should read -- common for professional --.
Line 18, reads "severally" and should read -- severely --.
Line 37, reads "the stability fibers with" and should read -- the stabilizing fibers with --.

Column 3,
Line 8, reads "Bergein" and should read -- Bergevin --.
Line 30, reads "sub-irrigation" and should read -- subirrigation --.
Line 31, reads "evapoatranspiration" and should read -- evapotranspiration --.

Column 4,
Line 49, reads "to substantially biodegradable within about" and should read -- to substantially biodegrade within about --.

Column 5,
Line 14, reads "In affect, they" and should read -- In effect, they --.
Line 18, reads "zinc condition" and should read -- zinc omadine --.

Column 6,
Line 35, reads "composition backing" and should read -- composite backing --.

Column 7,
Line 3, reads "from" and should read -- for --.

Column 8,
Line 27, reads "is" and should read -- it --.

Column 10,
Line 15, reads "wove" and should read -- woven --.
Line 64, reads "bee" and should read -- been --.

UNITED STATES PATENT AND TRADEMARK OFFICE
CERTIFICATE OF CORRECTION

PATENT NO. : 6,247,267 B1
DATED : June 19, 2001
INVENTOR(S) : Joseph E. Motz, Mark A. Heinlein and Steve Linville It is certified that error appears in the above-identified patent and that said Letters Patent is hereby corrected as shown below:

Column 11,
Line 34, reads "but" and should read -- be --.
Line 48, reads "composite backing 122a" and should read -- compositing backing 122 --.

Column 12,
Line 63, reads "turf 0" and should read -- turf 10 --.

Column 13,
Lines 30-31, reads "primary backing 22a," and should read -- primary backing 122a, --.

Column 15,
Line 23, reads "no decomposition agent nor any stabilizing agent" and should read -- no decomposition agent or stabilizing agent for --.

Column 16,
Line 45, reads "placing a plurality of stabilized natural turf section together" and should read -- placing a plurality of stabilized natural turf sections together --.

Signed and Sealed this

Eighth Day of April, 2003

JAMES E. ROGAN
*Director of the United States Patent and Trademark Office*